United States Patent
Suh et al.

(10) Patent No.: US 8,117,133 B2
(45) Date of Patent: Feb. 14, 2012

(54) SYSTEM AND METHOD FOR PROVIDING REGIONAL COMMUNITY-BASED MEMBERSHIP SERVICE

(75) Inventors: In Soo Suh, Jeju (KR); Geun-Young Kang, Jeju (KR); Hyug Jun Ko, Yongin (KR)

(73) Assignee: Jeju Hi-Tech Industry Development Institute (KR)

( * ) Notice: Subject to any disclaimer, the term of this patent is extended or adjusted under 35 U.S.C. 154(b) by 351 days.

(21) Appl. No.: 12/267,678

(22) Filed: Nov. 10, 2008

(65) Prior Publication Data

US 2010/0131376 A1    May 27, 2010

(51) Int. Cl.
*G06Q 99/00*    (2006.01)
(52) U.S. Cl. ............... 705/325; 705/5; 705/6; 705/26.1; 235/375
(58) Field of Classification Search .................. None
See application file for complete search history.

(56) References Cited

U.S. PATENT DOCUMENTS

| | | | | |
|---|---|---|---|---|
| 5,948,040 A | * | 9/1999 | DeLorme et al. | 701/201 |
| 6,386,451 B1 | * | 5/2002 | Sehr | 235/384 |
| 2002/0099794 A1 | * | 7/2002 | Lue Chee Lip et al. | 709/218 |
| 2002/0143588 A1 | * | 10/2002 | Ishigami et al. | 705/5 |
| 2002/0169692 A1 | * | 11/2002 | Dutta et al. | 705/27 |
| 2003/0046287 A1 | * | 3/2003 | Joe | 707/10 |
| 2004/0102991 A1 | * | 5/2004 | Casey et al. | 705/1 |
| 2005/0165651 A1 | * | 7/2005 | Mohan | 705/26 |
| 2005/0180570 A1 | * | 8/2005 | Sussman | 380/255 |
| 2007/0108267 A1 | * | 5/2007 | Jonsson et al. | 235/379 |
| 2008/0270938 A1 | * | 10/2008 | Carlson | 715/810 |

OTHER PUBLICATIONS

"Research and Markets: Mounting Security Concerns Driving Market Growth Within the World Smart Cards Market", M2 Presswire, Coventry: Oct. 23, 2007, p. 1.*

* cited by examiner

*Primary Examiner* — M. Thein
(74) *Attorney, Agent, or Firm* — Harness, Dickey & Pierce, P.L.C.

(57) ABSTRACT

Disclosed herein is a system and method for providing a regional community-based membership service. The method includes registering a customer visiting a certain region as a membership service customer through classification of the customer according to a degree of private relation with the region or according to whether the customer is a foreigner; authenticating a membership of the customer by a service terminal linked to a membership service system server via on-line communication, processing provision of various services by the service terminal, the various service including reservation and commodity purchase ordered from the authenticated customer, and settling or storing details of the services provided to the membership service customer in a database of the service system server. The method enables establishment of a variety of regional community-based businesses and an increase in number of visitors to the region by providing specified regional services to members of the membership service.

18 Claims, 9 Drawing Sheets

SYSTEM AND METHOD FOR PROVIDING REGIONAL COMMUNITY-BASED MEMBERSHIP SERVICE

BACKGROUND OF THE INVENTION

1. Field of the Invention

The present invention relates to a system and method for providing a regional community-based membership service. More particularly, the present invention relates to a system and method for providing a regional community-based membership service to a visitor of a certain region through classification of the visitor according to predetermined regional standards, such as a degree of private relation with the region and the like, such that various differentiated membership services relating to reservation, commodity purchase, reserve points, and the like can be provided to the visitor according to the standard of the classification.

2. Description of the Related Art

Currently, various membership services are provided to customers via marketing businesses or credit cards for commodity purchase, service purchase, and the like.

The membership services are granted in various forms to members who satisfy a predetermined requirement for differentiated services and businesses.

One of the most commonly available membership services is provided by a mobile communication company that issues a membership card to a customer, who has joined a membership of the company, to provide customer services and perform additional businesses.

Many credit card companies also issue membership cards for sales induction through quality enhancement and differentiation of services with a variety of benefits.

As such, the membership card is used by the member of the mobile communication company or the like, who satisfies the predetermined requirement for obtaining the membership card, thereby enabling customer services, additional businesses or credit transactions.

However, since the conventional membership card is issued for the purpose of a predetermined credit transaction or customer service, it is difficult to obtain various services based on a regional community with such a membership card.

For example, such a membership card has many restrictions in provision of various intra-regional membership services to visitors of a certain region such as tourist sites, famous cities, or the like.

In this case, although the visitor can use an international credit card, this can be used only in a registered franchise of that credit card, thereby making it difficult for the visitor to use or obtain various and specific services, which can be provided in the tourist sites and the like, with such an international credit card.

On the other hand, in view of a region such as tourist sites or famous cities, there is a need for inducing visitors to the region by providing a predetermined membership service to the visitors without the use of the credit card, which requires a predetermined commission fee for purchase of various regional community-based commodities or services.

SUMMARY OF THE INVENTION

The present invention is conceived to solve the problems of the prior art as described above, and an aspect of the present invention is to provide a system and method for providing a regional community-based membership service to a visitor of a certain region through classification of the visitor according to predetermined regional standards, such as a degree of private relation with the region and the like, such that various differentiated membership services relating to reservation, commodity purchase, reserve points, and the like can be provided to the visitor according to the standard of the classification.

Another aspect of the present invention is to provide a system and method for providing a regional community-based membership service to a visitor of a certain region to allow the visitor to purchase or acquire various regional community-based information, commodities or services as the membership service through a kiosk linked to a central control system without use of a credit card in the regional community.

In accordance with an aspect of the present invention, a method for providing a regional community-based membership service includes: registering a customer visiting a certain region as a membership service customer through classification of the customer according to a degree of private relation with the region or according to whether the customer is a foreigner; authenticating a membership of the customer by a service terminal linked to a membership service system server via on-line communication; processing provision of various services by the service terminal, the various service including reservation and commodity purchase ordered from the authenticated membership service customer; and settling or storing details of the services provided to the membership service customer in a database of the service system server.

If the customer is a native, the registering step may include: sending customer information input by the customer to the database of the service system; registering the customer as an intra-regional resident membership service customer of the region by analyzing an address and a postal code among the customer information; and registering the customer as a quasi-regional resident membership service customer of the region or as a native membership service customer by analyzing a resident registration number among the customer information.

If the customer is a foreigner, the registering step may include: sending customer information input by the customer to the database of the service system; analyzing a language code among the customer information; and registering the customer as a European language, English, Chinese or Japanese speaking membership service customer according to a result of analyzing the language code.

The authenticating step may include: allowing the service terminal to receive a membership number input by the membership service customer; sending a query of the input membership number from the service terminal to the service system server to confirm whether the membership service customer is a membership service member; determining whether the membership service member is an authenticated member; releasing a locked screen of the service terminal; and displaying a service menu corresponding to a result of the classification of the customer on the screen of the service terminal.

The authenticating step may further include guiding the customer to join the membership service if the membership service customer is not a membership service member.

The authenticating step may further include: sending a password from the service system server to a mobile terminal of the membership service customer by means of an SMS if the membership service customer is not an authenticated member; allowing the service terminal to receive the password input by the membership service customer; and sending the password from the service terminal to the service system server to authenticate the membership service customer.

The processing step may include: analyzing a member classification code for classifying the membership service customer; displaying commodity information and discount/reserve point information to the classified membership service customer; receiving settlement and shipment information input by the membership service customer with respect to the provision of the services; determining whether the membership service customer has a requested membership service password; and receiving the requested membership service password input by the membership service customer.

The determining step may further include: sending the membership service password from the service system server to a mobile terminal of the membership service customer by means of an SMS if the membership service customer does not have the requested membership service password.

In the displaying step and in the step of receiving settlement and shipment information, if the classified membership service customer is the foreigner, a window for outputting the commodity information and discount/reserve point information, and a window for inputting the settlement and shipment information are provided in English, Japanese, Chinese, or European languages If tourist information is purchased via the service terminal, the processing step may include: connecting a storage unit including a memory card or a USB card to a predetermined port of the service terminal; performing upload/download of the tourist information or selecting a folder management function by using the service system server; downloading the tourist information purchased from the service system server or storing the tourist information in a private directory on an FTP server; and managing a file storage space of the memory card.

In accordance with another aspect of the present invention, a system for providing a regional community-based membership service includes: a membership service system server configured to register a customer visiting a certain region as a membership service customer through classification of the customer according to a degree of private relation with the region or according to whether the customer is a foreigner, to store information of the customer, and to provide information of various commodities and services to the membership service customer; an information providing terminal configured to provide information of various commodities and other contents to the membership service system server; a plurality of service terminals linked to the membership service system server via on-line communication, each service terminal being configured to perform membership authentication when a membership service customer terminal of the membership service customer accesses the service terminal and to perform provision of various services including reservation and commodity purchase; and a service terminal management server configured to control and manage the service terminals.

The system terminals may be constituted by kiosks disposed at predetermined places.

Each of the kiosks may be provided with a reservation confirmation module, a membership management module, an entrance ticket purchase module, a tourist information module, a telephone/SMS module, and a convenient facility module to perform the provision of various services including the reservation and the commodity purchase.

Each of the kiosks may include a touch screen, an internet phone, a USB port, a card reader, a heat transfer printer, and a flash memory reader.

The membership service system server may include: a web-server configured to allow a membership service customer terminal to access thereto via the Internet; a database server configured to store data from the service terminals and the information providing terminal; and application processing modules configured to process control instructions and information from the web-server, the service terminals and the information providing terminal, and to process provision of various services ordered from the membership service customer in connection with the database server.

The information providing terminal may include a tourist information providing terminal, a commodity provider terminal, a package tourist information providing terminal, a tourist information database, and an exterior-linked database.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE INVENTION

Exemplary embodiments of the present invention will hereinafter be described in detail with reference to the accompanying drawings.

Herein, a system for providing a regional community-based membership service according to one embodiment of the present invention will be described as being applied to Jeju Island in Korea as one example.

Figure 1:
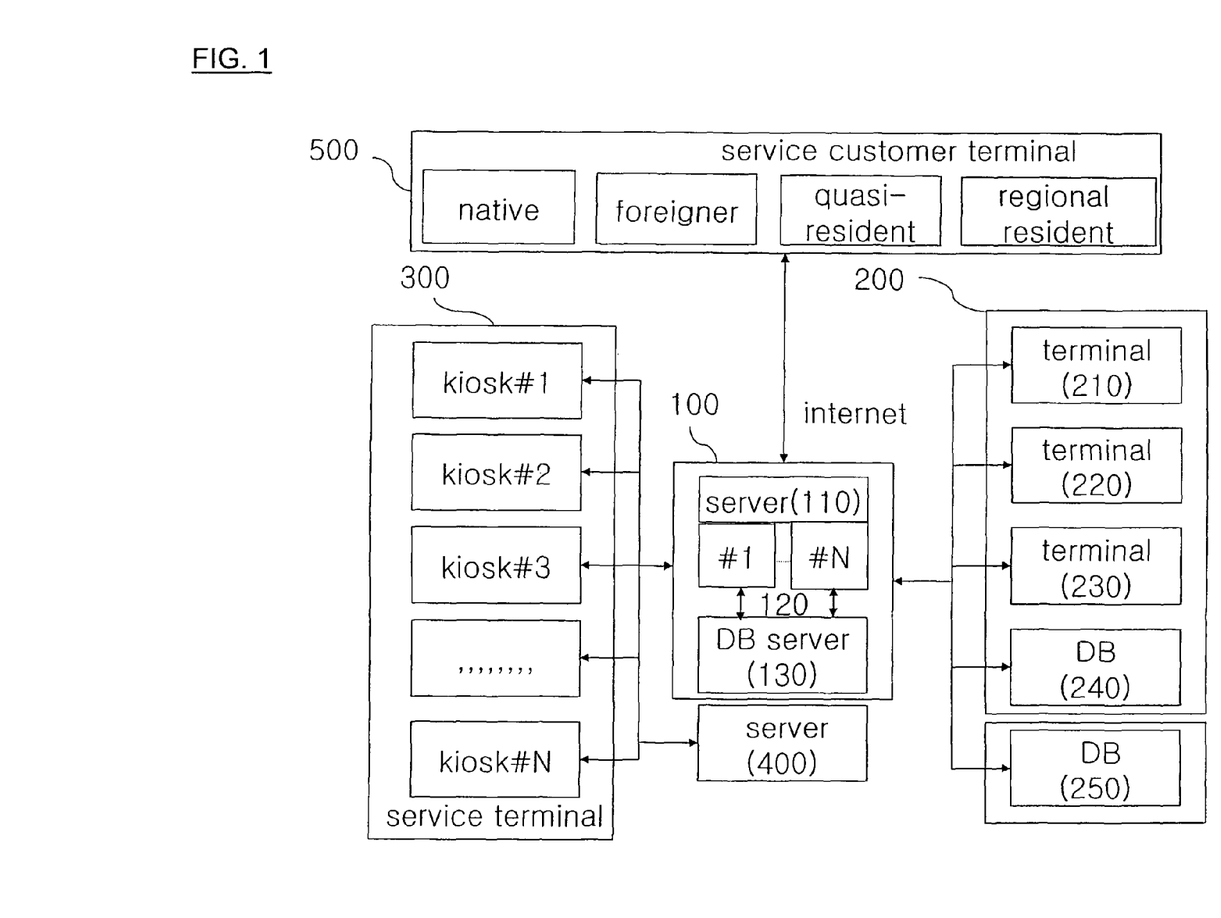
FIG. 1 is a block diagram of a system for providing a regional community-based membership service according to one embodiment of the present invention.

FIG. 1 is a block diagram of a system for providing a regional community-based membership service according to one embodiment of the present invention.

Referring to FIG. 1, the system according to the embodiment of the invention includes: a membership service system server 100 configured to provide the regional community-based membership service in a central control manner; an information providing terminal 200 configured to provide information of various commodities and other contents to the membership service system server 100; a plurality of service terminals 300 linked to the membership service system server 100 via on-line communication, each service terminal being configured to perform membership authentication of a membership service customer accessing the service terminal 300 and to perform provision of various services including reservation and commodity purchase; and a service terminal management server 400 configured to control and manage the service terminals 300.

The membership service system server 100 registers a customer visiting a certain region as a membership service customer through classification of the customer according to a degree of private relation with the region or according to whether the customer is a foreigner, stores customer information of the membership service customer, and provides information of various commodities and services to the membership service customer.

Referring to FIG. 1, the membership service system server 100 includes a web-server 110, a plurality of application processing modules 120, and a database server 130 linked to the application processing modules 120.

The web-server 110 allows a membership service customer terminal 500 to access thereto via the Internet and to perform customer registration, commodity purchase via the web, remote reservation via the web, or the like.

A customer on the membership service customer terminal 500 can be classified into a native customer, a foreign customer, a quasi-regional resident customer, and a regional resident customer.

Here, the membership service customer terminal 500 can access the web-server 110 via the Internet, and includes personal computers, mobile terminals, and the like. However, it should be noted that the membership service customer terminal 500 is not limited thereto and includes any kinds of wired- or wireless terminals capable of accessing the web.

The database server 130 stores data from the service terminals 300 and the information providing terminal 200, and is linked to the application processing modules 120.

The application processing modules 120 process control instructions and data from the web-server 110, the service terminals 300 and the information providing terminal 200, and also process various orders for services from the membership service customer in connection with the database server 130.

Each of the service terminals 300 is linked to the membership service system server 100 via the Internet to allow customer authentication of the membership service customer accessing the same and to perform the provision of various services including the reservation and commodity purchase according to various service menus supplied from the membership service system server 100.

The service terminals 300 are installed at predetermined places within a predetermined region where the regional community-based membership service is provided.

For example, the service terminals 300 may comprise kiosks displaced at predetermined places such as tourist sites, airports, luxury hotels, and shopping malls in Jeju Island.

Referring to FIG. 1, in order to provide a membership service based on Jeju Island which is a famous tourist region in Korea, the plural information providing terminals 200 for providing information of various commodities and other contents to the membership service system server 100, and include a tourist information providing terminal 210, a commodity provider terminal 220, a package tourist information providing terminal 230, a tourist information database 240, and an exterior-linked database 250.

The tourist information providing terminal 210 sends various tourist information of Jeju Island, such as tourist sites, food, transportation, event experiences, and the like, to the membership service system server 100 according to the request from the membership service customer.

In the commodity provider terminal 220, not only is information of various commodities, such as indigenous products of Jeju Island, tourism products, beauty products, and the like, provided to the membership service system server 100, but also the provision of an associated commodity to the membership service customer is performed if the membership service customer purchases the commodity via the membership service system server 100.

The package tourist information providing terminal 230 sends special tourism product information, such as a package tourism product including all of transportation, lodgings and tourism, an experience type tourism product and the like, to the membership service system server 100.

The tourist information database 240 stores information, such as general tourist information, tourist sites, lodgings, food, transportation, and event information within Jeju Island, and sends this information to the membership service system server 100.

The exterior-linked database/terminal 250 may be constituted by a database and a terminal such as a computer for processing commodity shipment information, shipment, reservation information, reservation, membership service customer settlement, and the like with regard to the membership service system server 100.

Figure 2:
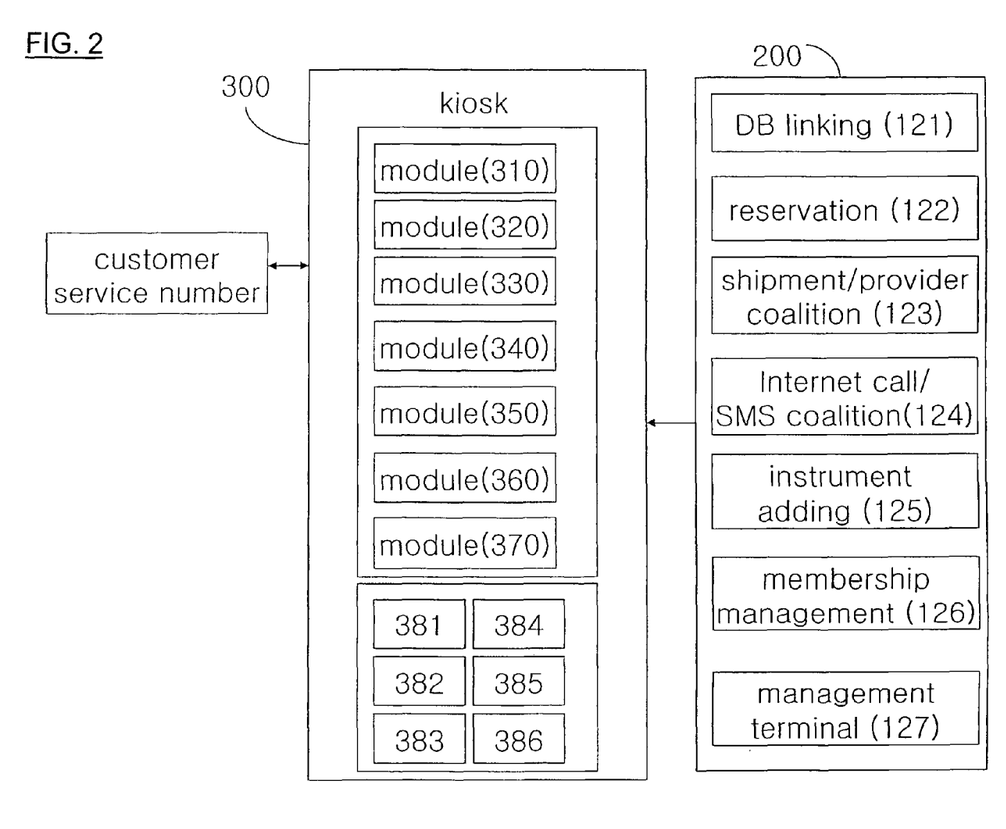
FIG. 2 is a detailed block diagram of a service terminal of the system according to one embodiment of the present invention.

FIG. 2 is a detailed block diagram of a service terminal of the system according to one embodiment of the present invention.

In the embodiment shown in FIG. 2, the service terminal 300 is constituted by a kiosk.

The kiosk acting as the service terminal 300 includes software modules which can act as service menus provided to the membership service customer via a screen of the kiosk.

Further, the service terminal 300 includes hardware components which can be directly manipulated by the membership service customer.

As the software modules, a tourist information module 310, a reservation confirmation module 320, an indigenous product purchase module 330, a membership management module 340, a tourist site entrance ticket purchase module 350, a telephone/SMS module 360, and a convenient facility module 370 are embedded in the kiosk acting as the service terminal 300 to perform the provision of various services such as reservation, commodity purchase, etc., in connection with the membership service system server 100 via the Internet.

Here, the telephone/SMS module 360 is a menu for supplying a service which enables the membership service customer authorized by the kiosk to send or receive internet calls or SMS messages. The convenient facility module 370 is a menu for supplying convenient services for the membership service customer, such as a mobile terminal, an electric charger for mobile phones, and the like.

In order to process the service menus provided to the membership service customer via the screen of the kiosk, the service system server 100 is linked to an intra-regional tourism database linking part 121, a reservation management system 122, a shipment/provider coalition part 123, an internet call/SMS company coalition part 124, an instrument adding part 125, a membership management part 126, and a management terminal 127.

In order to allow the membership service customer to access the kiosk, it is necessary for the customer to finish membership authentication.

For authentication of the membership service customer, the membership service customer inserts a membership card into the kiosk or inputs a membership number thereto.

The membership number is granted to the membership service customer through classification of the membership service customer according to a degree of private relation with Jeju Island or according to whether the membership service customer is a foreigner.

Here, the membership service customer is classified into a Jeju Island resident, a quasi-Jeju Island resident, a native, and a foreigner.

In more detail, for example, in the case of imparting a bar-code type membership number, since a postal number of an address of a Jeju Island resident membership service customer is constituted by 690-xxx, the membership service customer of this case belongs to a Jeju Island resident membership and is provided with a bar-code membership number of 690-*******, which is formed by coupling the postal number and a resident registration number of the membership service customer.

Herein, a quasi-Jeju Island resident refers to a person who has a private relation with Jeju Island or who was born therein. For the quasi-Jeju Island resident, since the rear part of the resident registration number has a figure "9" in the rear part of the resident registration number as in "000000-x9xxxxx," the membership service customer of this case belongs to a quasi-Jeju Island resident membership and is provided with a bar-code membership number of, for example, 9xx-*******.

A native membership service customer is provided with a bar-code membership number formed by coupling the first three digits of a postal code of an address of the native and seven digits of the resident registration number, such as "first three digits-********."

In the case where a foreigner becomes a member in this system, the foreigner is provided with a bar-code number of EU-xxxxxxx, ENG-xxxxxxx, JP-xxxxxxx or CN-xxxxxxx through classification of the foreigner into a European language speaking membership (EU), an English speaking membership (ENG), a Japanese speaking membership (JP) or a Chinese speaking membership (CN) according to a national code of the foreigner.

Differentiated membership services can be provided to the membership service customer according to the classified membership number. For example, when entering or using a casino or the like in a tourist site, the membership service customer is authenticated by means of the membership number, and is naturally classified into any one of a foreigner, a native, a quasi-regional resident and an inter-regional resident to regulate entrance of the membership service customer into the casino or the like or to allow the membership service customer to select a game permitted to him or her.

Particularly, in a place such as a hotel for tourists, the membership number can be used to identify a membership grade of the membership service customer, which is determined according to whether the membership service customer is a foreigner, a native, a quasi-regional resident or an inter-regional resident. Thus, various grades of service content, videos, DVDs, or the like can be selectively provided to the membership service customer according to the membership number.

On the other hand, the kiosk acting as the service terminal 300 is provided with a touch screen 381, an internet phone 382, a USB port 383, a bar-code reader 384, a heat transfer printer 385, and a flash memory reader 386 as hardware components which can be directly manipulated by the membership service customer.

Here, it should be noted that the bar-code reader 384 is provided as an example. Thus, the present invention is not limited to the bar-code reader, and may employ any of card reader capable of recognizing a smart card, RFID, a bar-code card, a memory card, a magnetic card, and the like. Thus, the membership number is not limited to the bar-code, and may be provided in a variety of forms.

The touch screen 381 is provided to allow the membership service customer to manipulate the screen of the kiosk according to menus. The internet phone 382 is provided to allow the membership service customer to use the telephone/SMS module 360, and the flash memory reader 386 is provided to upload or download tourist information, images and the like. The USB port 383 provides connectivity with a storage unit.

The bar-code reader 384 is used to recognize a bar-code type membership number which is input by the membership service customer.

The heat transfer printer 385 is used to output service details, a reservation confirmation sheet or an admission ticket purchased in the tourist site entrance ticket purchase module 350.

Figure 3:
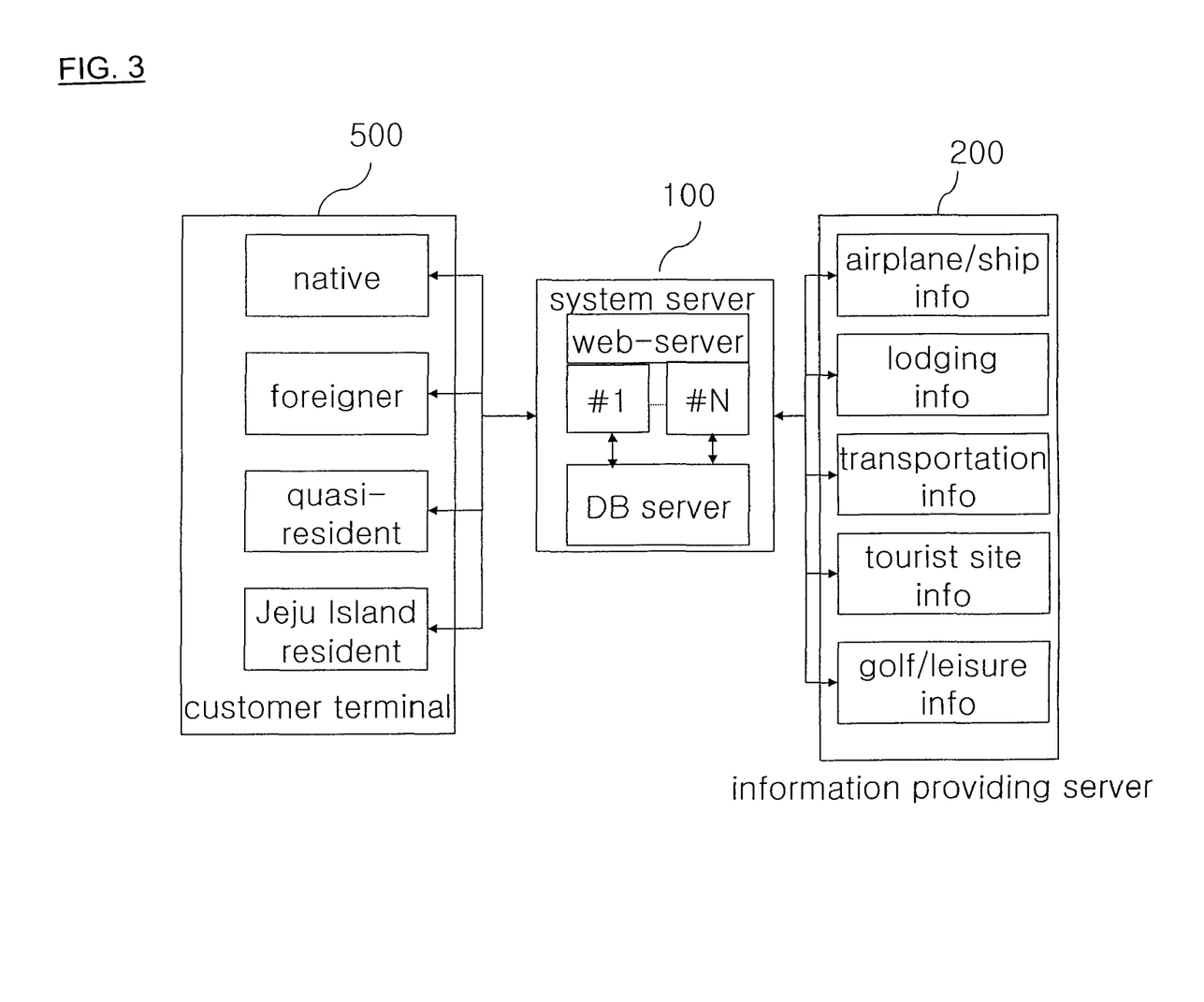
FIG. 3 is a block diagram of a reservation process conducted over the web in the system according to one embodiment of the present invention.

FIG. 3 is a block diagram of a reservation process conducted over the web in the system according to one embodiment of the present invention.

Referring to FIG. 3, a customer joining the membership service of this system and classified via the web is allowed to make a reservation on the associated customer terminal 500 with reservation information supplied from the information providing terminals 200 via the membership service system server 100.

Specifically, the customer joining the membership service of this system can make various remote reservations via the web with airplane/ship reservation information, lodging reservation information, intra-regional transportation reservation information, tourist site reservation information, golf/leisure reservation information, and the like, which are supplied as reservation information from the information providing terminals 200.

Figure 4:
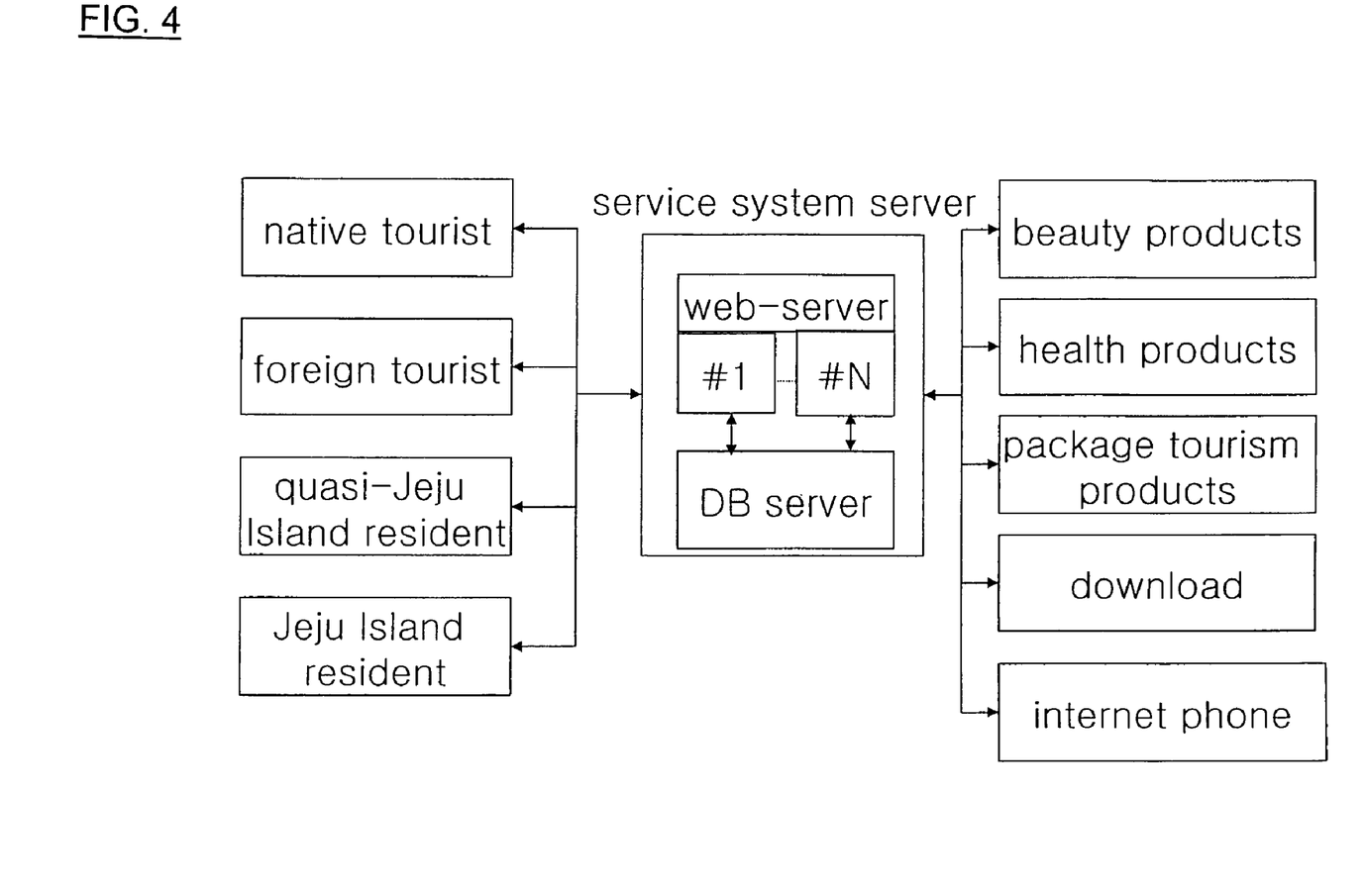
FIG. 4 is a block diagram of a commodity purchase process conducted over the web in the system according to one embodiment of the present invention.

FIG. 4 is a block diagram of a commodity purchase process conducted over the web in the system according to one embodiment of the present invention.

Referring to FIG. 4, a customer joining the membership service of this system and classified via the web is allowed to purchase a commodity on the associated customer terminal 500 with commodity information supplied from the information providing terminals 200 via the membership service system server 100.

Specifically, the customer joining the membership service of this system can purchase various commodities such as beauty products, health products, package tourism products, tourist information by download, or internet phone coupons via the web with the commodity information supplied from the information providing terminals 200.

Figure 5:
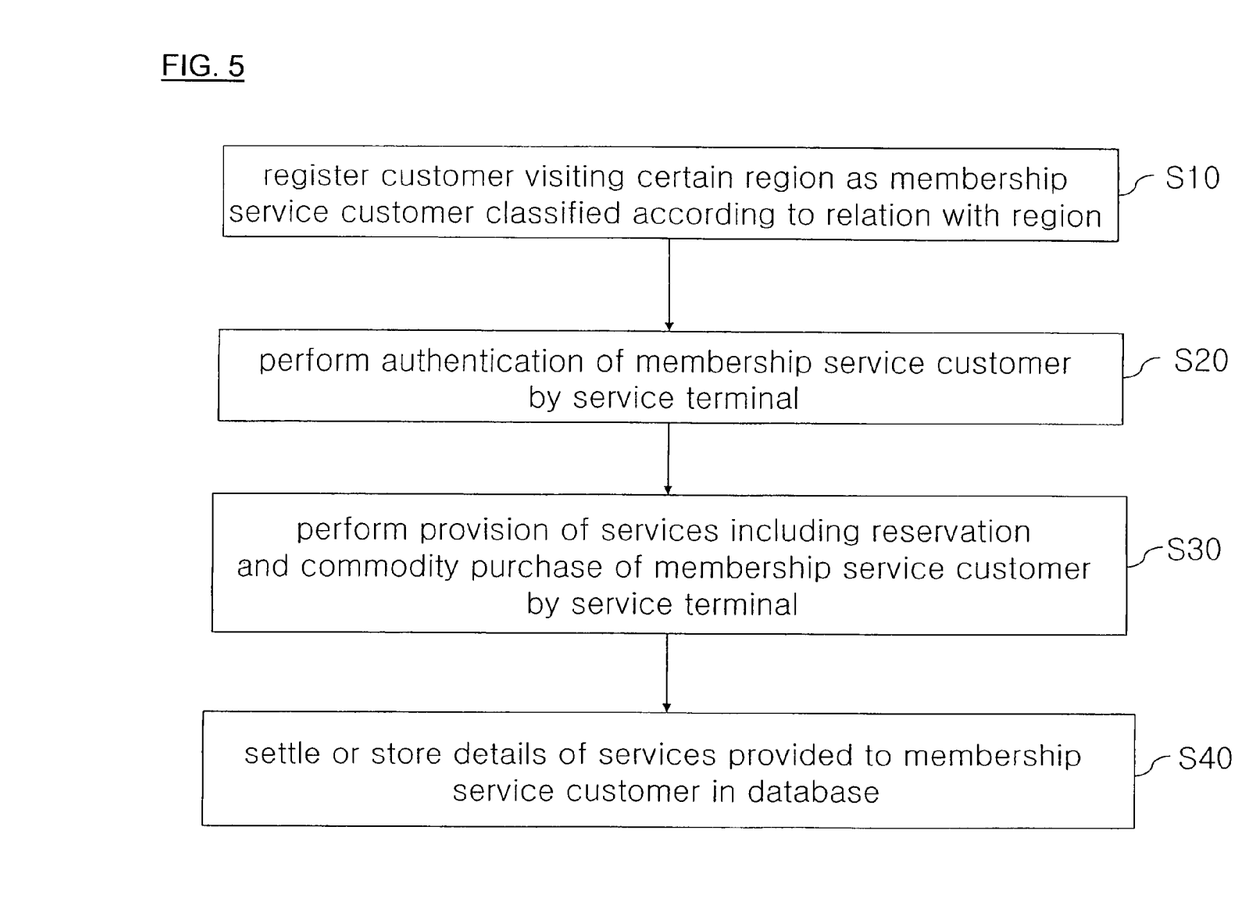
FIG. 5 is a flowchart of a method for providing a regional community-based membership service according to one embodiment of the present invention.

FIG. 5 is a flowchart of a method for providing a regional community-based membership service according to one embodiment of the present invention.

First, in operation S10, a customer visiting a certain region is registered as a membership service customer classified according to a degree of private relation with the region or according to whether the visiting customer is a foreigner.

Then, a service terminal linked to a membership service system server via on-line communication processes customer authentication of the membership service customer in operation S20.

Then, the service terminal is manipulated by the authenticated membership service customer to perform the provision of various services including reservation, commodity purchase, and the like, in operation S30.

Next, service provision details for the membership service customers are stored or settled in a database of the membership service system server in operation S40.

Figure 6:
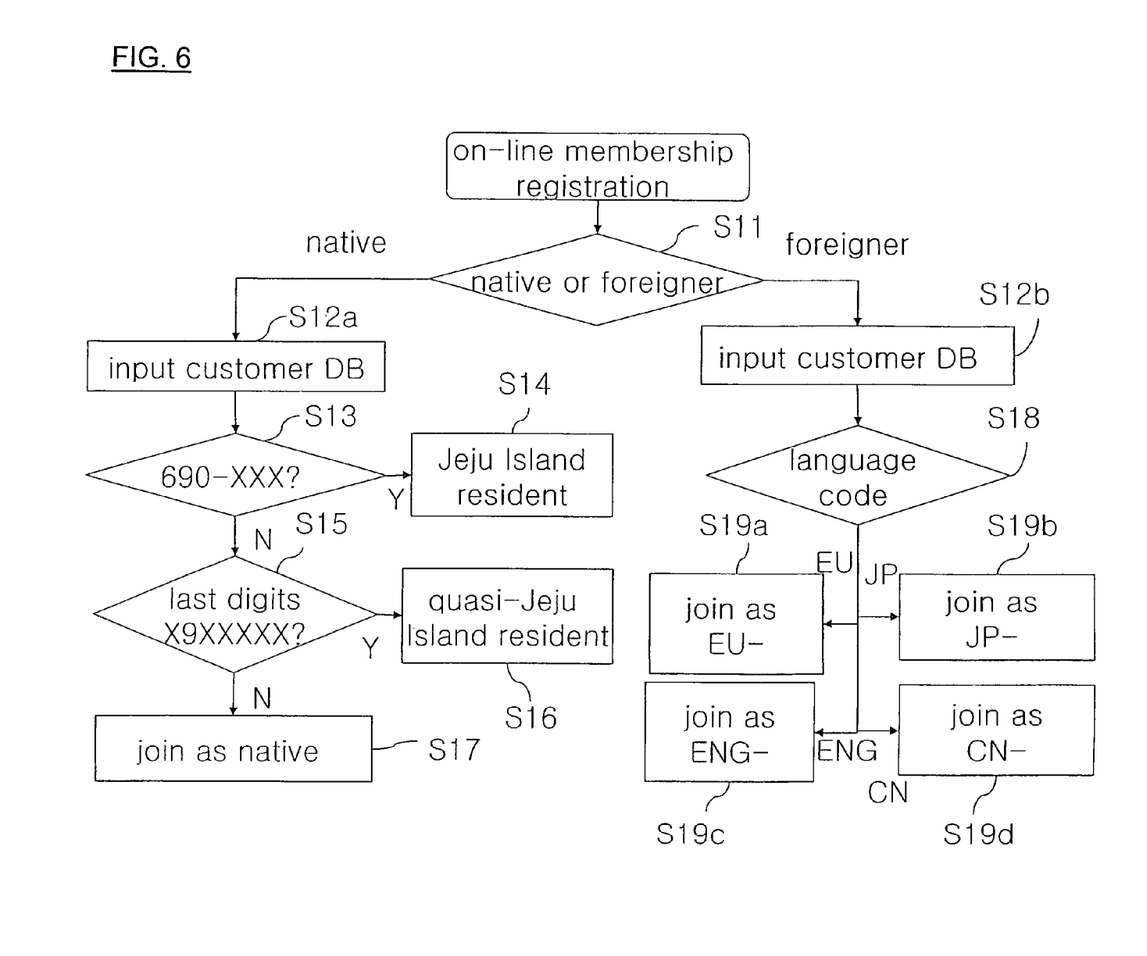
FIG. 6 is a flowchart of a process of registering a customer as a membership service customer in the method of FIG. 5.

FIG. 6 is a flowchart of a process of registering a customer as a membership service customer in the method of FIG. 5.

First, it is determined whether the membership service customer is a native or a foreigner in operation S11. If the membership service customer is a native, customer information of the membership service customer is input to the database of the membership service system server by the membership service customer in operation S12a.

Here, the input customer information includes, for example, ID/password, a resident registration number, a name, an address, and a phone number.

Then, among the customer information, the address and a postal number of the address are analyzed to register the membership service customer as a regional resident.

Specifically, in operation S13, it is determined whether a postal number of the address of the customer is in the form of, for example, 690-XXX or not. If the postal number is in the form of 690-XXX, the customer is allowed to join the membership service as a Jeju Island resident and is registered with a membership number of 690-********, which is provided in the form of a bar-code, in operation S14.

Further, the resident registration number of the customer is analyzed to register the customer as a quasi-regional resident or native.

Specifically, if it is determined in operation S13 that the postal number of the address of the customer is not in the form of 690-XXX, it is determined in operation S15 whether the rear part of the resident registration number of the customer is in the form of "X9XXXXX."

If it is determined in operation S15 that the rear part of the resident registration number of the customer is not in the form of "X9XXXXX," the customer is registered as a native and is given a bar-code type membership number of "the first three digits of the postal code-********" in operation S17.

Here, it should be noted that the aforementioned process of registering a customer as a membership service customer in the database of the membership service system server can also be performed off-line.

If it is determined in operation S11 that the membership service customer is a foreigner, the membership service customer is also allowed to input customer information to the database of the membership service system server in operation S12b.

Here, the input customer information includes, for example, ID/password, a name, an address, a phone number, and a language code.

Next, among the customer information, the language code is analyzed in operation S18.

According to a result of analysis of the language code in operation S18, the foreign customer is registered as a European language, English, Japanese or Chinese speaking membership service customer in operations S19a, S19b, S19c or S19d.

Figure 7:
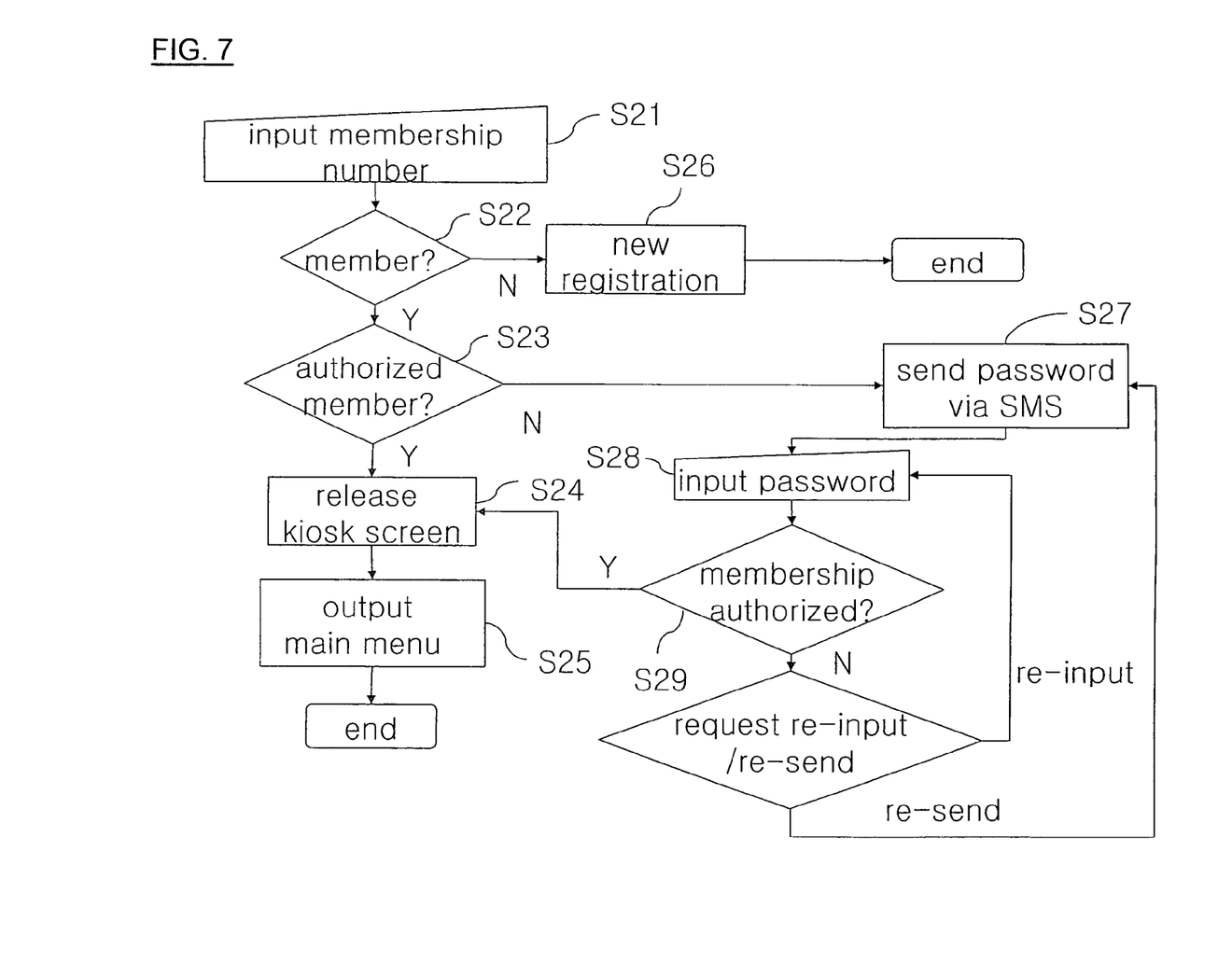
FIG. 7 is a flowchart of a process of authenticating a membership service customer in the method of FIG. 5.

FIG. 7 is a flowchart of a process of authenticating a membership service customer in the method of FIG. 5.

First, a membership number is input to the service terminal 300 by the membership service customer in operation S21.

Then, the service terminal 300 sends the membership number input to the membership service system server 100 to confirm whether the membership service customer is a member of the membership service in operation S22.

Next, it is determined whether the membership service customer is an authenticated member of the membership service in operation S23.

If it is determined in operation S23 that the membership service customer is the authenticated member of the membership service, a locked screen of the service terminal 300 is released to display service provision menus in operation S24.

Finally, a service menu screen according to a classification result of the membership service customer is displayed on the screen of the service terminal 300 in operation S25.

At this time, the displayed menu screens are differently specified with respect to a Jeju Island resident member, a quasi-Jeju Island resident member, a native member, a European language speaking member, an English speaking member, a Japanese speaking member, and a Chinese speaking member.

If it is determined in operation S22 that the customer is not the member of the membership service, an operation of guiding the customer to become a member of the membership service is performed in operation S26.

If it is determined in operation S23 that the customer is not an authenticated member of the membership service, the membership service system server 100 sends a password to the membership service customer terminal 500 by means of an SMS in operation S27.

Next, after the password is received by the membership service customer terminal 500, the password is input to the service terminal 300 in operation S28.

Then, the service terminal 300 sends the input password to the membership service system server 100 to confirm authentication of the membership in operation S29.

After operation S29, the process proceeds to operation S24 to display the service menu screen corresponding to the customer.

At a tourist site, the membership service customer authenticating process shown in FIG. 7 can be performed using a membership authenticating function to provide differentiated shopping information to a tourist.

At this time, according to authentication results of the membership service customer, a native membership tourist, a quasi-regional resident, or a regional resident is allowed to use a supplementary-tax exemption shopping mall, but prevented from accumulation of products therein by setting limitations on purchase according to the kind of membership. For a foreign tourist, a foreigner exclusive shopping center can be advertised via a kiosk, the Internet, or advertisement according to foreigner memberships.

Further, entrance of a shopping center can be allowed to the membership service customer via an authentication function embedded in a membership card of the membership service customer. Here, an English/Japanese/Chinese speaking guide or translator for shopping may be provided to the membership service customer according to a main language set in the membership card.

Figure 8:
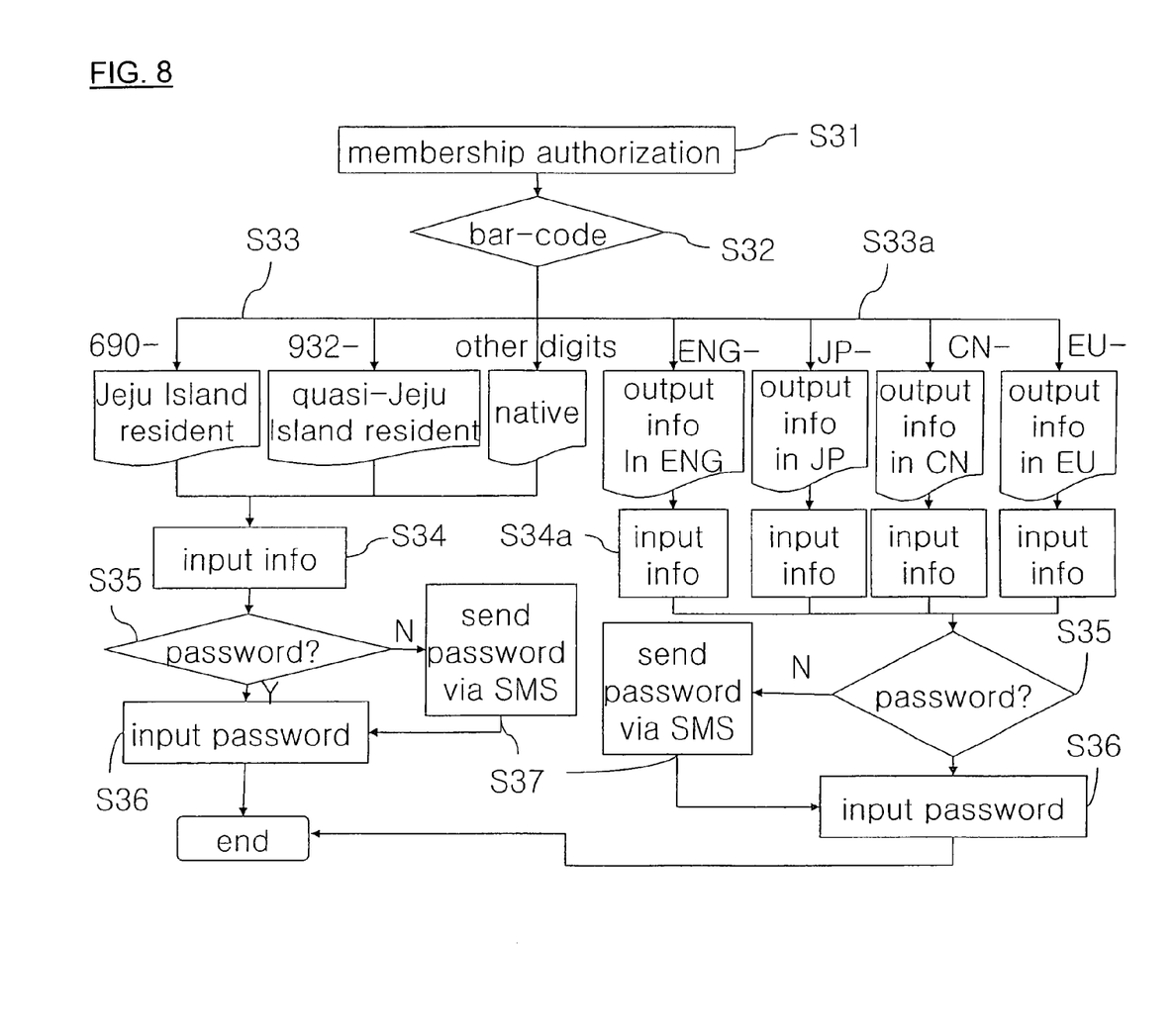
FIG. 8 is a flowchart of a process of handling a purchase order according to a membership service customer in the method of FIG. 5.

FIG. 8 is a flowchart of a process of handling a purchase order according to a membership service customer in the method of FIG. 5.

First, the membership number of the membership service customer is input to the service terminal 300 to finish customer authentication in operation S31.

Then, a customer classification code in the membership number is analyzed to classify the membership service customer in operation S32.

Commodity information and discount/reserve point information are displayed to the membership service customer classified in operation S32.

Here, if the membership service customer is a Jeju Island resident, a quasi-Jeju Island resident or a native, commodity information and discount/reserve point information are displayed in Korean on the screen in operation S33.

In classification of the membership service customer as the Jeju Island resident, quasi-Jeju Island resident or native, if the first three digits of the bar-code type membership number of the membership service customer are determined to be 690-, the membership service customer is classified as the Jeju Island resident. If the first three digits are determined to be 932-, the membership service customer is classified as the quasi-Jeju Island resident, and if the first three digits are determined to be anything else, the membership service customer is classified into the native.

Next, settlement and shipment information with respect to the provision of services is input via a Korean menu by the membership service customer in operation S34.

Then, it is determined whether the membership service customer has a requested membership service password in operation S35.

Here, the requested membership service password is input to finish the purchase process in operation S36.

Further, if it is determined in operation S35 that the membership service customer does not have the requested membership service password, the service system server 100 sends the password to the membership service customer terminal by means of an SMS in operation S37, and, when the requested membership service password is input, the purchase process is completed in operation S36.

On the other hand, if it is determined in operation S32 that the classified membership service customer is a foreigner, commodity information, discount information, and the like are displayed in English/Japanese/Chinese/European languages on the screen in operation S33a.

Here, in classification of the foreign customer, if the first letters of the bar-code type membership number are ENG-, the customer is classified as the English speaking member, and if JP-, the customer is classified as the Japanese speaking member. If the first letters are CH-, the customer is classified as the Chinese speaking member, and if EU-, the customer is classified as the European language speaking member. Thus, the commodity information, discount information, and the like can be properly displayed in English, Japanese, Chinese, or European languages on the screen.

Then, settlement and shipment information input menus are displayed in English, Japanese, Chinese, or European languages on the screen to allow the customer to input the settlement and shipment information in operation S34a.

Then, the process proceeds to operations S35 to S37 as in the case of the native.

Figure 9:
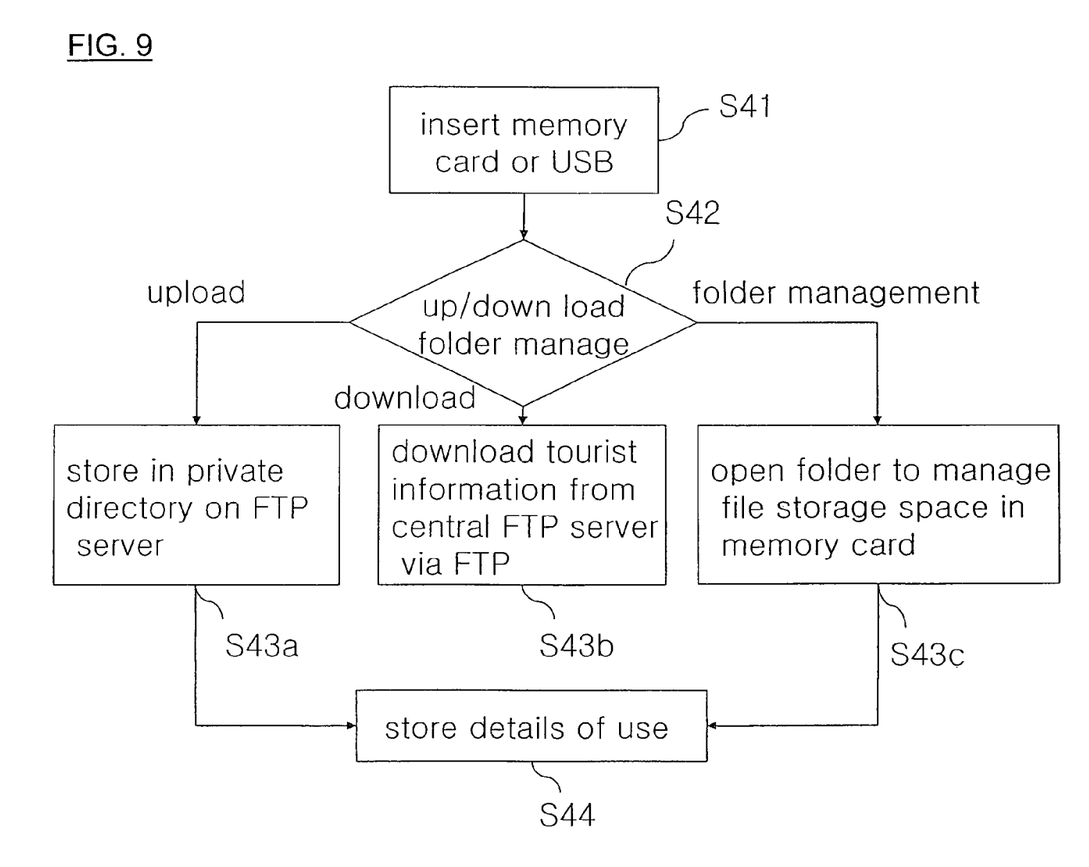
FIG. 9 is a flowchart of a process of selling tourist information as a membership service in the method of FIG. 5.

FIG. 9 is a flowchart of a process of selling tourist information as a membership service in the method of FIG. 5.

A storage unit such as a memory card, a USB card, or the like is connected to a predetermined port of a kiosk provided as the service terminal 300 in operation S41.

Here, the storage unit stores tourist information purchased by the membership service customer, or various images or moving images produced by the membership service customer.

Next, upload/download of the tourist information or selection of a folder management function is performed via the service system server in operation S42.

For upload of the tourist information, the tourist information purchased from the service system server 100 is stored in a private directory on an FTP server in operation S43a.

For download of the tourist information, the tourist information purchased from the service system server 100 is stored in the storage unit via FTP in operation S43b.

Additionally, a folder of the memory card can be opened to manage a file storage space in operation S43c.

Finally, details of the tourist information used by the membership service customer via the kiosk can be stored in the database of the membership service system server 100 in operation S44.

When a customer joins a membership of a J'ers membership service based on the Jeju Island community, various Jeju Island-based membership services, such as transportation reservation, on/off-line commodity purchase, lodgings, event experience services, and the like are provided to the customer.

In particular, when joining the membership service, the membership service customer can purchase or acquire various information, commodities and/or services specified to the Jeju Island community as the membership services via the kiosk, various terminals or web.

As apparent from the above description, the system and method according to the present invention provides a regional community-based membership service to a visitor of a certain region, in which the regional community-based membership service provides a variety of intra-regional services relating to reservation, commodity purchase, reserve points, and the like to the visitor.

Further, the system and method of the invention enables the visitor of the region to purchase or acquire various information, commodities or services based on the regional community as a membership service via a kiosk linked to a central control system without use of a credit card in the regional community.

Further, the system and method of the invention enables establishment of a variety of regional community-based businesses for membership customers, and allows the membership customers to employ various regionally specified services, thereby inducing an increase in number of visitors to the region.

Although the present invention has been described with reference to the exemplary embodiments, it will be apparent to those skilled in the art that the embodiments are given by way of illustration, and that various modifications and variations can be made in the present invention without departing from the spirit and scope of the present invention, as is defined only by the claims and their equivalents.

What is claimed is:

1. A method for providing a regional community-based membership service, comprising:

registering customers visiting a certain region as a membership service customer such at least one customer is a native and customers other than the at least one customer are classified into at least one of a regional resident, a quasi-regional resident, and a foreigner according to a degree of private relation with the region or according to whether the customer is a foreigner;

authenticating a membership of the membership service customer by a service terminal linked to a membership service system server via on-line communication;

processing provision of various services by the service terminal, the various service including reservation and commodity purchase ordered from the authenticated membership service customer; and settling or storing details of the services provided to the membership service customer in a database of the service system server;

wherein, if the customer is a native, the registering step comprises:

sending customer information input by the customer to the database of the service system;

registering the customer as a regional resident membership service customer of the region by analyzing an address and a postal code among the customer information; and registering the customer as a quasi-regional resident membership service customer of the region or as a native membership service customer by analyzing a resident registration number among the customer information.

2. The method according to claim 1, wherein, if the customer is a foreigner, the registering step comprises:
sending customer information input by the customer to the database of the service system;
analyzing a language code among the customer information; and
registering the customer as a European language, English, Chinese or Japanese speaking membership service customer according to a result of analyzing the language code.

3. The method according to claim 1, wherein the authenticating step comprises:
allowing the service terminal to receive a membership number input by the membership service customer;
sending a query of the input membership number from the service terminal to the service system server to confirm whether the membership service customer is a membership service member;
determining whether the membership service member is an authenticated member;
releasing a locked screen of the service terminal; and
displaying a service menu corresponding to a result of the classification of the customer on the screen of the service terminal.

4. The method according to claim 3, wherein the authenticating step further comprises guiding the customer to join the membership service if the membership service customer is not a membership service member.

5. The method according to claim 3, wherein the authenticating step further comprises:
sending a password from the service system server to a mobile terminal of the membership service customer by means of an SMS if the membership service customer is not an authenticated member;
allowing the service terminal to receive the password input by the membership service customer; and
sending the password from the service terminal to the service system server to authenticate the membership service customer.

6. The method according to claim 1, wherein the processing step comprises:
analyzing a member classification code for classifying the membership service customer;
displaying commodity information and discount/reserve point information to the classified membership service customer;
receiving settlement and shipment information input by the membership service customer with respect to the provision of the services;
determining whether the membership service customer has a requested membership service password; and
receiving the requested membership service password input by the membership service customer.

7. The method according to claim 6, wherein the determining step further comprises sending the membership service password from the service system server to a mobile terminal of the membership service customer by means of an SMS if the membership service customer does not have the requested membership service password.

8. The method according to claim 6, wherein, in the displaying step and in the step of receiving settlement and shipment information, if the classified membership service customer is the foreigner, a window for outputting the commodity information and discount/reserve point information, and a window for inputting the settlement and shipment information are provided in English, Japanese, Chinese, or European languages.

9. The method according to claim 1, wherein, if tourist information is purchased via the service terminal, the processing step comprises:
connecting a storage unit including a memory card or a USB card to a predetermined port of the service terminal;
performing upload/download of the tourist information or selecting a folder management function by using the service system server;
downloading the tourist information purchased from service system server or storing the tourist information in a private directory on an FTP server; and
managing a file storage space of the memory card.

10. The method according to claim 1, wherein the certain region is a specific region of a country and not the entire country.

11. The method according to claim 10, wherein the regional resident is a person living in the specific region and the quasi-regional resident is a person who has a private relation with the specific region but who does not live in the specific region.

12. The method according to claim 11, wherein the person who has a private relation with the specific region is a person who was born in the specific region.

13. A system for providing a regional community-based membership service, comprising:
a membership service system server configured to register customers visiting a certain region as a membership service customer such that at least one customer is a native and customers other than the at least one customer are classified into at least one of a regional resident, a quasi-regional resident and a foreigner according to a degree of private relation with the region or according to whether the customer is a foreigner, to store information of the customer, and to provide information of various commodities and services to the membership service customer;
an information providing terminal configured to provide information of various commodities and other contents to the membership service system server;
a plurality of service terminals linked to the membership service system server via on-line communication, each service terminal being configured to perform membership authentication when a membership service customer terminal of the membership service customer accesses the service terminal and to perform provision of various services including reservation and commodity purchase; and
a service terminal management server configured to control and manage the service terminals;
wherein, if the customer is a native, the membership service system server sends customer information input by the customer to a database of the service system, and registers the customer as a regional resident membership service customer of the region by analyzing an address and a postal code among the customer information, and registers the customer as a quasi-regional resident membership service customer of the region or as a native membership service customer by analyzing a resident registration number among the customer information.

14. The system according to claim 13, wherein the system terminals are constituted by kiosks disposed at predetermined places.

15. The system according to claim 14, wherein each of the kiosks is provided with a reservation confirmation module, a membership management module, an entrance ticket purchase module, a tourist information module, a telephone/

SMS module, and a convenient facility module to perform the provision of various services including the reservation and the commodity purchase.

16. The system according to claim 14, wherein each of the kiosks comprises a touch screen, an internet phone, a USB port, a card reader, a heat transfer printer, and a flash memory reader.

17. The system according to claim 13, wherein the membership service system server comprises:
   a web-server configured to allow the membership service customer terminal to access thereto via the Internet;
   a database server configured to store data sent from the service terminals and the information providing terminal; and
   application processing modules configured to process control instructions and information from the web-server, the service terminals and the information providing terminal, and to process provision of various services ordered from the membership service customer in connection with the database server.

18. The system according to claim 13, wherein the information providing terminal comprises a tourist information providing terminal, a commodity provider terminal, a package tourist information providing terminal, a tourist information database, and an exterior-linked database.

* * * * *